Nov. 14, 1967  J. L. WICKHAM  3,352,323
VALVE FOR REVERSIBLE PNEUMATIC TOOL
Filed Oct. 21, 1965
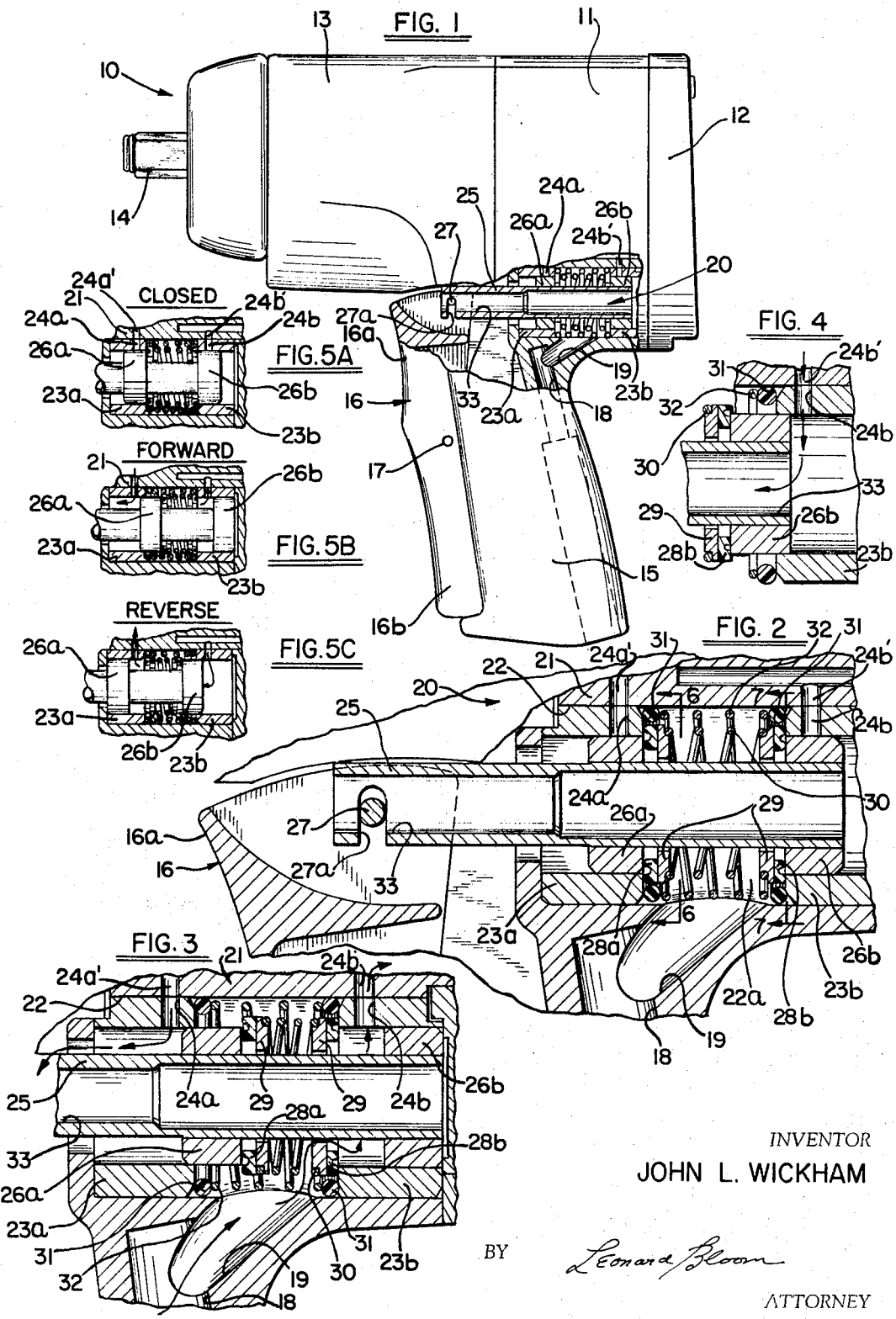
INVENTOR
JOHN L. WICKHAM
BY *Leonard Bloom*
ATTORNEY

United States Patent Office 3,352,323
Patented Nov. 14, 1967

3,352,323
VALVE FOR REVERSIBLE PNEUMATIC TOOL
John L. Wickham, Baltimore, Md., assignor to The Black and Decker Manufacturing Company, Towson, Md., a corporation of Maryland
Filed Oct. 21, 1965, Ser. No. 499,733
5 Claims. (Cl. 137—625.26)

The present invention relates to a valve for a reversible pneumatic tool, and more particularly, to the improved construction of a reversing valve and trigger mechanism to be used, for example, in a portable pneumatic impact wrench.

It is an object of the present invention to provide a reversing valve which is compact, economical, and relatively easy to assemble within the tool.

It is another object to provide a reversing valve having improved means for providing an effective seal in the closed or neutral position of the valve.

It is a further object to provide a face-sealing means in the closed position of the valve, thereby precluding a relative sliding movement between a sealing ring, such as an O-ring, and a structural element of the valve.

In accordance with the broad teachings of the present invention, there is herein illustrated and described, a valve for a reversible pneumatic tool. The valve is provided with a valve body having a chamber. A pair of axially-spaced bushings is retained in the chamber, and the chamber is pressurized intermediately of the bushings. Each of the bushings has a port formed therein, one for "forward" operation of the tool, the other for "reverse." The valve is further provided with an operating valve stem. The valve stem carries a pair of axially-spaced spools, one for each of the bushings; and the assembly of the valve stem and its spools is slidably guided in the bushings for longitudinal reciprocating, with the spools closing off the ports, respectively, in the closed position of the valve. A pair of sealing rings are disposed in the intermediate pressurized chamber. Each of the sealing rings is normally biased into sealing engagement with the respective axial end faces of a spool and a corresponding bushing, thereby maintaining effective sealing between the ports and the intermediate pressurized portion of the chamber in the closed position of the valve. When the valve stem is moved axially in one direction, one of the spools moves away from its sealing ring and then uncovers the port formed in its respective bushing, thereby communicating the intermediate pressurized chamber with the port and operating the tool in one direction. The other of the spools unseats its respective sealing ring from its respective bushing, continues to block the intermediate pressurized chamber from substantially communicating with its respective port, but uncovers its respective port sufficiently, however, to facilitate a secondary discharge from the tool.

These and other objects of the present invention will become apparent from a reading o fthe following specification, taken in conjunction with the enclosed drawings, in which:

FIGURE 1 is a side elevation of a typical pneumatic tool incorporating the teachings of the present invention, with parts broken away and sectioned to show the structure of the valve mechanism;

FIGURE 2 is an enlarged fragmentary portion of FIGURE 1, showing the valve mechanism in its normally closed position, and further showing the respective sealing rings in face-sealing engagement with the respective axial end faces of the spools and corresponding bushings;

FIGURE 3 corresponds substantially to that of FIGURE 2, but showing the valve in its forward position;

FIGURE 4 corresponds to a fragmentary portion of FIGURE 2, but showing the valve in its reverse position, with the forward port communicating with the tubular valve stem to facilitate a secondary discharge to atmosphere; and FIGURES 5a–5c are sequence views showing, respectively, the valve in its closed, forward, and reverse positions.

With reference to FIGURE 1, there is illustrated a portable pneumatic impact wrench 10 within which the teachings of the present invention may find particular utility. It will be appreciated, however, that the scope of the invention is not confined thereto, but rather is applicable to all types of reversible pneumatically-operated devices. With this in mind, the impact wrench 10 generally comprises a motor housing 11, a rear end cap 12, an impact clutch housing 13, an operating spindle 14 adapted to receive a socket or other element, a handle 15, the handle preferably being formed integrally with the motor housing and depending therefrom, an operating trigger 16 pivoted to the handle as at 17, a longitudinal channel 18 formed in the handle, the channel communicating with the source of compressed air, a passageway 19 communicating with the channel, and the reversing valve mechanism of the present invention, the latter being denoted generally as at 20.

With reference to FIGURE 2, the valve mechanism 20 comprises a body portion 21, formed integrally with the motor housing, and having a chamber 22 formed therein. Axially-spaced bushings 23a and 23b are retained in the chamber. The portion of the chamber intermediately of the bushings, as at 22a, communicates with the passageway 19 and thus is pressurized at all times. The bushings have respective ports 24a and 24b formed therein. Port 24b is for forward operation of the tool, and port 24a is for reverse, or vice-versa. The ports in turn communicate with respective ports 24a' and 24b' formed in the valve body and leading to the air motor.

An operating valve stem 25 has a pair of axially-spaced spools 26a and 26b secured thereto, preferably by a press-fit. The assembly of the valve stem and its spools is slidably guided within the bushings for limited longitudinal reciprocation. In the closed position of the valve, spool 26a closes port 24a, and spool 26b closes port 24b. The valve stem is connected with the trigger by means of a pin 27 and cooperating slot 27a. When the upper portion 16a of the pivoted trigger is engaged by the operator, the valve stem is retracted within the tool, that is, the valve stem moves to the right as viewed on the drawings; and when the lower portion 16b of the trigger is engaged by the operator, the valve stem is advanced forwardly of the tool, that is, it moves to the left as viewed in the drawings.

A pair of sealing rings 28a and 28b are provided in the intermediate pressurized chamber 22a. Each of the sealing rings is biased into face-sealing engagement with the respective axial end faces of a spool and a corresponding bushing. A washer 29 is loosely mounted on the stem axially adjacent to (and inwardly of) each of the sealing rings, and an inner coil spring 30 is seated between the washers so as to maintain the sealing rings in their normal face-sealing engagement in the closed position of the valve.

Completing the structure of the valve mechanism, an O-ring 31 is disposed axially adjacent to (and inwardly of) each of the bushings. The O-rings are disposed in the intermediate pressurized chamber 22a (in radial engagement with the chamber) and are biased against the bushings by means of an outer coil spring 32 seated between the O-rings. With this arrangement, the outer surface of each bushing is effectively sealed from the intermediate pressurized chamber 22a. Moreover, the valve stem is preferably formed as a tubular member having a longitudinal through bore 33.

With reference to FIGURE 3, when the trigger 16 is engaged by the operator so as to move the valve stem 25 to the right, the spool 26b moves away from its sealing ring 28b and uncovers its port 24b. This allows compressed air to be admitted from the intermediate pressurized chamber 22a (between the respective washer and the outer surface of the valve stem) into the port 24b. The tool is then operated in the forward position as indicated in FIGURE 5b. At the same time, the other spool 26a, while unseating its respective sealing ring 28a from its respective bushing 23a, nevertheless, continues to substantially block the intermediat pressurized chamber 22a from the port 24a. The spool 26a moves sufficiently, however, to uncover the port 24a, and this facilitates a secondary exhaust from the air motor in the tool, as indicated by the small arrows on FIGURES 3 and 5b.

With reference to FIGURES 4 and 5c, when the trigger 16 is engaged by the operator so as to move the valve stem 25 to the left, the spool 26a moves away from its respective sealing ring 28a and uncovers the port 24a. This allows compressed air to be admitted from the intermediate pressurized chamber 22a (between the respective washer and the outer surface of the valve stem) into the port 24a. The tool is then operated in its reverse position. At the same time, the other spool 26b while unseating its respective sealing ring 28b from its respective bushing 23b, nevertheless continues to substantially block the intermediate pressurized chamber 22a from its respective port 24b. In this regard, the operation of the valve is identical in its forward and reverse positions. However, as shown in FIGURE 4, the spool 26b uncovers the port 24b sufficiently to communicate the port 24b with the longitudinal through bore 33 in the valve stem; and this facilitates a secondary exhaust to atmosphere down through the valve stem.

The respective sealing rings 28a and 28b are in face-sealing engagement (with the movable spools and fixed bushings) along a plane which is generally transverse to the reciprocation of the valve stem; and with this arrangement, none of the valve members has a relative sliding movement directly against a sealing ring, as is otherwise the case in the prior art designs.

Obviously, many modifications may be made without departing from the basic spirit of the present invention; and accordingly, within the scope of the appended claims, the invention may be practiced other than has been specifically described herein.

I claim:
1. A valve for a reversible pneumatic tool, comprising:
 (a) a valve body having a chamber;
 (b) a pair of axially-spaced bushings fixedly retained in the chamber;
 (c) means pressuring the chamber intermediately of the bushings;
 (d) each of the bushings having a port formed therein spaced from the chamber, one for "forward" operation of the tool and the other for "reverse";
 (e) a valve stem;
 (f) a pair of axially-spaced spools fixedly secured to the stem, one within each of the bushings;
 (g) whereby the assembly of the stem and its spools is slidably guided in the bushings for longitudinal reciprocation, and whereby the spools close off the ports, respectively, in the closed position of the valve;
 (h) a pair of sealing rings in the intermediate pressurized chamber; and
 (i) means biasing each of the sealing rings in the closed position of the valve into face-sealing engagement with the respective axial end faces of a spool and a corresponding bushing, thereby maintaining effective sealing in the closed position of the valve;
 (j) whereby when the valve stem is moved axially in one direction, one of the spools moves away from its sealing ring and then uncovers the port formed in its respective bushing, thereby communicating the intermediate pressurized chamber with the port; and
 (k) whereby the other of the spools unseats its respective sealing ring from its respective bushing, continues to block the intermediate pressurized chamber from effectively communicating with its respective port, and uncovers its respective port sufficiently, however, to facilitate a secondary discharge from the valve.

2. The valve described in claim 1, wherein:
 (a) the valve stem has a longitudinal through bore, communicating with the respective "forward" port in the "reverse" position of the valve, thereby facilitating a secondary exhaust to atmosphere.

3. The valve described in claim 1, wherein:
 (a) a washer is loosely mounted on the stem axially adjacent to, and inwardly of, each sealing ring; and wherein:
 (b) the biasing means is a coil spring seated between the washers to maintain the sealing rings in their normal face-sealing engagement.

4. The valve of claim 1, wherein:
 (a) an O-ring is disposed axially adjacent to, and inwardly of, each bushing;
 (b) said O-rings being disposed in the intermediate pressurized chamber in radial engagement with the chamber; and wherein:
 (c) a coil spring is seated between the O-rings;
 (d) whereby the outer surface of each bushing and the intermediate pressurized chamber, axially inwardly of the respective ports, is effectively sealed.

5. In a portable reversible pneumatic tool, the combination of:
 (a) a housing providing a valve body formed with a chamber in communication with a source of compressed air;
 (b) a first port formed in the valve body at one end of the chamber for establishing "forward" operation of the tool;
 (c) a second port formed in the valve body at the opposite end of the chamber for establishing "reverse" operation of the tool;
 (d) a valve member guided for movement within the valve body;
 (e) first means effecting a seal between the chamber and the first port and responsive to movement of the valve member in one direction to uncover said first port;
 (f) second means effecting a seal between the chamber and the second port and responsive to movement of the valve member in another direction to uncover said second port;
 (g) a handle formed on the housing; and
 (h) a trigger pivotably supported mediate its ends on the handle and having one end operatively connected with the valve member, said trigger having respective leg portions, each of which extends forwardly of the handle; whereby one end of said trigger is actuated for "forward" operation of the tool, and the other end is actuated for "reverse" operation of the tool;
 (i) whereby, when the trigger is actuated for "forward" operation, the valve member moves in one direction, thereby uncovering said first port and admitting compressed air from the chamber into said first port; and (j) whereby, when the trigged is actuated for "reverse" operation, the valve member moves in another direction, thereby uncovering said second port and admitting compressed air from the chamber into said second port.

References Cited

UNITED STATES PATENTS

| | | | |
|---|---|---|---|
| 2,283,810 | 5/1942 | Johnson | 137—596.18 |
| 2,415,417 | 2/1947 | Collins et al. | 137—625.69 |
| 2,503,827 | 4/1950 | Langmore et al. | 137—596.1 |
| 2,631,571 | 3/1953 | Parker | 137—625.68 |
| 2,632,424 | 3/1953 | Slomer | 173—169 X |
| 2,742,056 | 4/1956 | Williams | 137—625.68 |
| 2,969,045 | 1/1961 | Clar | 137—625.69 X |
| 3,106,939 | 10/1963 | Flick | 137—625.69 |

FOREIGN PATENTS 377,323  5/1921  Germany.

M. CARY NELSON, *Primary Examiner.*

H. KLINKSIEK, *Assistant Examiner.*